United States Patent
Lundberg et al.

[11] 4,104,824
[45] Aug. 8, 1978

[54] MULTIPHASE BLOCK AND GRAFT COPOLYMERS COMPRISING A HYDROPHILIC CONTINUOUS PHASE AND HYDROPHOBIC DOMAINS

[75] Inventors: Robert D. Lundberg, Somerville; Neville G. Thame, Edison, both of N.J.

[73] Assignee: Exxon Research & Engineering Co., Linden, N.J.

[21] Appl. No.: 758,421

[22] Filed: Jan. 11, 1977

Related U.S. Application Data

[60] Division of Ser. No. 553,613, Feb. 27, 1975, Pat. No. 4,057,598, which is a continuation of Ser. No. 327,831, Jan. 29, 1973, abandoned.

[51] Int. Cl.$^2$ ................................. A01C 1/04
[52] U.S. Cl. .................... 47/58; 260/857 G; 47/56; 47/DIG. 10
[58] Field of Search ........ 47/9, 58, DIG. 7, DIG. 10, 47/DIG. 11; 260/857 G

[56] References Cited

U.S. PATENT DOCUMENTS

| | | | |
|---|---|---|---|
| 3,336,129 | 8/1967 | Herrett et al. | 47/9 X |
| 3,705,467 | 12/1972 | McKnight | 47/9 |
| 3,798,838 | 3/1974 | Hashimoto et al. | 47/58 |
| 3,847,641 | 11/1974 | Cushman et al. | 47/58 X |
| 3,973,355 | 8/1976 | McKenzie | 47/DIG. 7 |
| 4,045,387 | 8/1977 | Fanta et al. | 47/DIG. 10 |

FOREIGN PATENT DOCUMENTS 601,558 7/1960 Canada ............................. 47/DIG. 10
1,287,998 9/1972 United Kingdom ............... 47/DIG. 11

Primary Examiner—Robert E. Bagwill
Attorney, Agent, or Firm—Robert J. Baran; Richard E. Nanfeldt

[57] ABSTRACT

This invention relates to thermoplastic, multiphase copolymers selected from the group consisting of copolymers represented by graft copolymers having the general formula

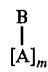

and block copolymers having the general formula $xB-[AB]_n-yA$ wherein $n$ is an integer $\geq 1$, $m$ is $> 1$, $x$ and $y$ are 0 or 1, and $y$ is 1 when $n$ is 1, A is a thermoplastic, hydrophobic polymer block having a softening point (i.e., a glass transition or cyrstalline melting point) of at least 35° C and a molecular weight of at least 2,000, and B is a thermoplastic, hydrophilic polymer block having a softening point of at least about 35° C and a molecular weight of at least about 6,000, which comprises from about 30–97 wt % of said copolymer. The novel polymers of this invention are useful for making water containing gels. Preferably, the thermoplastic multiphase copolymer is a styrene-ethylene oxide copolymer. The novel polymers are made by a process which allows one to prepare a copolymer which is substantially free of homopolymeric impurities. The compositions of the instant invention are melt processable by conventional thermoplastic techniques.

9 Claims, No Drawings

MULTIPHASE BLOCK AND GRAFT COPOLYMERS COMPRISING A HYDROPHILIC CONTINUOUS PHASE AND HYDROPHOBIC DOMAINS

This is a division of application Ser. No. 553,613, filed 2/27/75. (now U.S. Pat. No. 4,057,598). Ser. No. 553,613 was a continuation of application Ser. No. 327,831, filed 1/29/73 and now abandoned.

FIELD OF THE INVENTION

This invention relates to thermoplastic, multiphase copolymers selected from the group consisting of copolymers represented by graft copolymers having the general formula

and block copolymers having the general formula $xB-[AB]_n-yA$ wherein $n$ is an integer $\geq 1$, $m$ is $> +1$, $x$ and $y$ are 0 or 1, and $y$ is 1 when $n$ is 1, A is a thermoplastic, hydrophobic polymer block having a softening point (i.e., a glass transition or crystalline melting point) of at least 35° C and a molecular weight of at least 2,000, and B is a thermoplastic, hydrophilic polymer block having a softening point of at least about 35° C and a molecular weight of at least about 6,000, which comprises from about 30–97 wt % of said copolymer. Preferably $n$ and $m$ are less than 100, more preferably less than 20. The novel polymers of this invention are useful for making water containing gels. Preferably, the thermoplastic multiphase copolymer is a styrene-ethylene oxide copolymer. The novel polymers are made by a process which allows one to prepare a copolymer which is substantially free of homopolymeric impurities. The compositions of the instant invention are melt processable by conventional thermoplastic techniques, and thus may be extruded or calendered into films, or compression molded, or injection molded into complex shapes. The resulting products possess a unique combination of properties. Films, for example, prepared from these novel compositions are useful in agricultural applications wherein seeds are directly implanted in the film, and the film layed in the field. The novel films of this invention act as a water retention agent during the germination of the seeds and subsequently promote the survival of the seedling. This characteristic is especially valuable in arid and semi-arid agricultural areas.

BACKGROUND OF THE PRIOR ART

Segmented copolymers of ethylene oxide and styrene, acrylonitrile, or methyl methacrylate are known in the art. U.S. Pat. No. 3,257,476 teaches block polymers of polyvinyl monomers, for example, styrene and polypropylene oxide. Specifically, that patent teaches the preparation of such block copolymers by the reaction of hydroperoxide compounds with polymeric compounds containing isocyanate groups to create polymeric peroxy carbamates. These peroxy carbamates are then used to catalyze the free radical polymerization of ethylenically unsaturated monomers. While this approach can be employed to prepare block copolymers, it has the disadvantage that the ethylenically unsaturated monomer can also homopolymerize. Consequently, the resulting polymers are invariably accompanied by substantial amounts of polyvinyl homopolymer (this is pointed out in U.S. Pat. No. 3,257,476).

Another description of block copolymers of ethylene oxide and styrene, methyl methacrylate and acrylonitrile has been reported by Brooks and Daffin (Polymer Preprints, Vol. 10, No. 2, September 1969, p. 1174). These workers utilized the approach of U.S. Pat. No. 3,257,476 to prepare block polymers for examination as membranes. They observed that (1) vinyl homopolymer was necessarily obtained as a contaminant, (2) the resulting polymers possessed very poor strength properties, and (3) were so troublesome to work with that those investigators were motivated to examine other systems.

The present invention differs from that of U.S. Pat. No. 3,257,476 in that the block copolymers prepared are substantially free of polyvinyl homopolymer. The importance of preparing block copolymers free of homopolymers of either block will be shown subsequently in this invention. It has been found surprisingly that physical properties such as clarity, tensile strength, elongation, and flexibility, and general mechanical properties are dramatically superior in those block polymers which are substantially free of homopolymer contamination. Obviously this finding is of tremendous importance from an applications viewpoint.

U.S. Pat. No. 3,050,511 teaches block copolymers of polystyrene and ethylene, propylene, or 1,2-butylene oxide. The compositions taught by that patent differ from the instant compositions in that those patented compositions are AB or BAB block polymers wherein A represents the hydrophobic portion, i.e. polystyrene, and B represents the hydrophilic portion, i.e. polyethylene oxide. The compositions of the instant invention are those represented by graft copolymers having the general formula

and block copolymers having the general formula $xB-[AB]_n-yA$ wherein $n$ is an integer $\geq 1$, $m$ is $> 1$, $x$ and $y$ are 0 or 1, and $y$ is 1 when $n$ is 1. It is only the compositions of this invention which provide a unique combination of properties not provided by two block systems, or the three block systems in which the center block is the hydrophobic block.

Finally, a recent publication (Shimura and Lin, J. Poly. Sci., Part A-1, 8, 2171 (1970)) discloses that block copolymers of polystyrene and polyethylene oxide can be prepared via a process similar to one described in the present invention. They prepared $[AB]_n$ block polymers wherein the A blocks or polystyrene blocks varied from 2,250 to 6,200 in molecular weight, and the B blocks or poly(ethylene oxide) varied from 404 to 5,650. They report that only soft, elastic products could be achieved, and, indeed, for block polymers where the polyethylene oxide (or polyethylene glycol) blocks were longest (5,650 molecular weight) the polymer was too soft to be measured at ordinary temperature ranges.

The products of the instant invention differ dramatically from those above for reasons that will be discussed subsequently in some detail. The products of this invention are hard, rigid multiphase plastics. Clearly these properties are unexpected in view of the prior art.

SUMMARY OF THE INVENTION

The instant invention relates to new compositions of matter which comprise a thermoplastic multiphase copolymer selected from the group consisting of copolymers represented by graft copolymers having the general formula

$$\begin{array}{c} B \\ | \\ [A]_m \end{array}$$

and block copolymers having the general formula $xB—[AB]_n—yA$ wherein $n$ is an integer $\geq 1$, $m$ is $>1$, $x$ and $y$ are 0 or 1, and $y$ is 1 when $n$ is 1, A is a thermoplastic hydrophobic polymer block, and B is a thermoplastic hydrophilic polymer block. Preferably $n$ and $m$ are less than 100, more preferably less than 20. Both the A and the B block have a softening temperature (i.e., a glass transition or a crystalline melting point) of at least 35° C. The B block will comprise from about 30 to 97 weight % of said copolymer, preferably from about 50 to 96 weight %, and most preferably from about 70 to 95 weight % of said total polymer. The B block will have an average molecular weight of at least 6,000, preferably at least 7,500, and most preferably 9,000. The average molecular weight of the A block will be at least 2,000, preferably at least 5,000, and most preferably from about 5,000 to 10,000. The composition of the instant invention will have an average molecular weight of at least 10,000, preferably the average molecular weight will be at least 20,000, and most preferably, to provide the proper rheological characteristics desirable for melt fabrication, the average molecular weight will vary from about 25,000 to 500,000. It should be noted that molecular weight throughout this specification shall mean number average molecular weight.

The monomers which may be utilized to prepare the hydrophilic block include ethylene oxide, acrylamide, α-hydroxyethylmethacrylate and vinylpyrolidone. In general, those monomers which when polymerized yield water soluble homopolymers will be operative in this invention. However, the most preferred monomer is ethylene oxide because the polymers based on this monomer are most suited to commercial processes of polymer fabrication.

Throughout these discussions below the hydrophilic or hydrophobic phases will be referred to by using the terminology "poly(monomer repeat unit)". Thus, the hydrophobic phase comprised of polystyrene will be referred to as such, although often these polymer blocks will be prepared from a glycol such as α,§polystyrene glycol. This becomes important in the case of poly(ethylene oxide) which will often be derived from polyethylene glycol. Nevertheless the monomer repeat unit in both cases is ethylene oxide. These terms will be used interchangeably when describing the hydrophilic phase, but when describing a specific experimental preparation, the appropriate chemical term will be employed.

In general, any monomer which may be polymerized to form a hydrophilic block may be utilized in the process of the instant invention. Copolymer blocks may also be employed as long as the total block is hydrophilic in character (i.e. soluble in water). Examples of such copolymer blocks are copolymers of ethylene oxide and propylene oxide, or ethylene oxide and 1,2-butylene oxide wherein the ethylene oxide comprises > 80% by weight of the total polymer block. Preferably, however, the block is a homopolymeric block.

The monomers utilized to prepare the hydrophobic polymer block may be selected from the group consisting of styrene, t-butyl styrene, α-methyl styrene, vinyl toluene, methyl methacrylate, polyamides, such as the condensation polymers of hexamethylene diamine and adipic acid (nylon 6,6), methacrylonitrile, acrylonitrile, and polylactones (i.e. poly-ε-caprolactone).

The hydrophobic block may also be made up of copolymer units so long as the total block is substantially hydrophobic, i.e. water insoluble. Once again, the preferred hydrophobic block will be a homopolymeric block.

It is also critical that the hydrophilic and hydrophobic blocks be substantially immiscible in each other, so that when utilized to prepare compositions of the instant invention each block will exist in a separate phase. This allows the formation of domains, which may act as physical crosslinks, and thus give the composition of the instant invention properties which are similar to other compositions known in the art that are chemically crosslinked, e.g., high mechanical strength, good dimensional stability, etc. However, these physical crosslinks can be made to disappear either by dissolving the polymer in a suitable solvent or by heating the polymer above the softening point of both phases so that the domains are substantially dissociated to permit melt processability. Thus, various articles of commerce based on the compositions of this invention may be formed by well-known solution casting or coating to yield films and coatings. Alternatively these compositions may be made into various articles of commerce, such as tapes, belts, straps, molded articles, etc., by employing conventional thermoplastic processing techniques such as extrusion, calendering, injection molding, etc.

The criticality of suitable phase separation in these block copolymers can be exemplified by comparing the products of the instant invention with those described in the prior art. For example, block copolymers of polystyrene glycols and polyethylene glycol (block polymers where the monomer repeat units are styrene and ethylene oxide, respectively) have been described wherein the polyethylene oxide blocks are relatively low in molecular weight, from 404 to 5,650. In particular, the polyethylene oxide block length represents an extremely important value because this polymer phase is the preferred continuous phase for these systems. It has been found, surprisingly, that hard, rigid, plastic materials can be formed from polystyrene-polyethylene oxide block copolymers provided that the polyethylene oxide block is at least above 6,000 and preferably 7,500 in molecular weight.

While not wishing to be bound by theory, the reasons for this remarkable change in materials is believed to arise from the following. Other investigators (Read, *Polymer;* 3, p. 529 (1962); and Faucher et al., *J. Appl. Phys.*, 37, No. 11, p. 3962 (1966) have shown that for polyethylene glycols there is a marked and dramatic increase in crystallinity for molecular weights of 6,000 to 20,000 when compared to lower or higher molecular weight species. Because polymer crystallinity is especially dependent on polyethylene glycol molecular weight in the region of 6,000, it is evident that subtle changes in the block length of this polymer segment will determine (a) the degree and perfection of phase separation in block polymers, (b) the degree of crystallinity of the polyethylene glycol phase, and (c) which phase is the continuous one.

The properties of the polymers of the instant invention are determined by the polymer present as the continuous phase, and it is desired for this invention that the polyethylene oxide or hydrophilic block represents the continuous phase. Therefore, it is obvious that the polyethylene oxide phase must develop a high degree of crystallinity in order that the resulting product is a multiphase plastic. In order that this be achieved a minimum molecular weight for this phase must be in excess of 6,000, preferably in excess of 7,500, and most preferably in excess of 9,000.

The molecular weight of the hydrophobic phase is less critical just so long as it forms a well-defined separate phase. In general, this is achieved with a polymer block of at least 2,000 in molecular weight, and preferably at least about 5,000. In the case of a polystyrene phase for example, suitable phase separation is manifested with block molecular weights as low as 5,000 to 10,000.

It is important for the products of this invention that both phases soften above room temperature, i.e., a softening point of at least about 35° C, and preferably about 45° C. This softening point can be either a polymer glass transition or a crystalline melting point. For example, polyethylene oxide has a crystalline melting point near 60° C which is ideally suited for this invention. If this softening point is not above room temperature, the resulting materials do not retain the dimensional stability of a plastic system. This requirement can also be expressed in quantitative terms relating to stiffness of the resulting products. Thus, at room temperature (i.e., 25° C) it is required that the multiphase plastics of this invention exhibit a stiffness or secant modulus of at least 5,000 psi, and preferably above 10,000 psi. This value is determined by subjecting the specimen to tensile stress and elongating it 1%. The modulus is then calculated as the ratio of the tensile stress (T) needed to elongate the sample 1% of its original length to the elongation (or strain) of the specimen.

1% secant modulus for a 1 in. specimen = T/0.01 = 100T

Furthermore, the softening point of the hydrophobic phase must also be at least about 35° C, and preferably above about 45° C. This is a necessary requirement in order that the products of this invention retain dimensional stability when the hydrophilic phase is swollen by water or otherwise altered. However, it is also important that the softening points of both blocks not be too high such that the polymers are no longer melt processable. For this reason, a maximum softening point for both phases is about 260°, and preferably about 200° C.

The compositions of the instant invention are unique in that they are readily converted into water retaining gels of excellent dimensional stability, and yet are melt processable and soluble in suitable solvents. It has been previously known that polyethylene oxide may be crosslinked by irradiation and the resulting irreversibly crosslinked materials utilized as water retaining gels (see British Pat. No. 1,117,032). However, those crosslinked systems are not melt processable. Thus, they have not achieved wide commercial acceptance. It is also clear that irradiation processes for achieving such chemical crosslinks may be complex, expensive and potentially dangerous. In view of these considerations it is clear that systems possessing the water retaining characteristics of chemically crosslinked species and yet possessing the added virtue of melt processability would represent a major advance in the art.

As discussed previously, it is known that polyethylene oxide may be combined with polystyrene to form two block copolymers of the AB type, where A is polystyrene and B is polyethylene oxide, said two block copolymers being useful as antistatic agents. These compositions, as well as three block copolymers wherein polyethylene oxide blocks are terminal and polystyrene is the center block, are not within the scope of the instant invention since the optimum properties, i.e. water-retaining gel properties, as well as melt processing properties, are not obtained unless the specific type block polymers as represented above are utilized. The preferred compositions of the instant invention are ABA copolymers wherein A and B are as previously described. For example, poly(piperazine-sebacamide)-polyethylene oxide-poly(piperazine-sebacamide), poly(-hexamethylene diamine-adipic acid)-polyethylene oxide-poly(hexamethylene diamine-adipic acid), polystyrene-polyacrylamide-polystyrene, polystyrene-polyvinyl pyrrolidone-polystyrene, polyacrylonitrile-polyethylene oxide-polyacrylonitrile, poly-t-butyl styrene-polyethylene oxide-poly-t-butyl styrene, polyvinyl toluene-polyethylene oxide-polyvinyl toluene, polymethylmethacrylate-polyethylene oxide-polymethylmethacrylate, polymethacrylonitrile-polyethylene oxide-polymethacrylonitrile, etc. are preferred compositions within the scope of the instant invention.

It is important to emphasize that the block or graft polymers of this invention always have at least 1 hydrophilic polymer block in the interior of the polymer chain, i.e. the center block of a 3-block copolymer, or one of the two interior blocks of a 4-block copolymer, etc., or alternatively represent the backbone of a graft copolymer of the

type. It is believed this is a necessary requirement to achieve the very desirable properties of this invention. For example, it has been found that an xB—[AB]$_n$—yA block copolymer where A blocks are polystyrene and B blocks are polyethylene oxide can be solvated by water to create highly flexible elastomeric clear or translucent films, and molded objects. Depending on composition, these products can absorb up to 10 or 20 times their weight of water. It is theorized that this property is a consequence of the polymers of this invention possessing strong physical crosslinks resulting from the interaction of the A blocks of one polymer chain with the A blocks of another polymer chain. Only when this interaction is achieved with at least two separated A blocks within a single polymer chain, can the strong physical crosslinking phenomenon occur which gives rise to the flexible, tough, water-extended compositions of this invention. It is now clear that a polymer structure of the AB or BAB types cannot be effective in creating such compositions. Therefore, the polymers of this study and their interaction with aqueous solutions are clearly differentiated from those previously disclosed.

The two-phase nature of these block copolymers arises from the incompatibility of the hydrophobic and hydrophilic phases. The composition of the block copolymer in terms of the hydrophobic/hydrophilic balance has a major effect on the polymer properties. For most of the applications for which these block polymers are being utilized, it is desirable that the hydrophilic phase exist as the continuous phase with the the hydrophobic phase being dispersed as the domains. This is achieved most readily if the hydrophilic phase exists as the predominant phase, i.e., if it comprises greater than 50% by weight of the polymer composition. It is possible to achieve a situation where the hydrophilic phase predominantly exists as the continuous phase even when this phase constitutes as little as 30% by weight by appropriate thermal treatment, or by casting films and coatings from solvents which are especially good solvents for the hydrophilic phase, and yet are not as good solvents for the hydrophobic phase.

It was observed that if the hydrophilic phase comprises too high a fraction of the total composition of the block copolymers, then the beneficial effects of the physical crosslinking can be diminished. An upper limit of about 97% by weight for the hydrophilic phase is established as the maximum hydrophilic phase content at which the domains can still manifest beneficial properties in these systems. The range of hydrophilic content (or B block) will be from about 30 weight percent to about 97 weight percent of the copolymer, preferably from about 50 weight percent to about 96 weight percent, and most preferably from about 70 weight percent to about 95 weight percent.

The $xB—[AB]_n—yA$ block copolymers can be prepared by several different techniques. The choice of the A and B polymer block is limited by the above parameters and polymerization chemistry. Several acceptable procedures are as follows. Poly(ethylene oxide) of suitable molecular weight and capped at each end with hydroxyl groups (commercially available as polyethylene glycols or Carbowaxes (Union Carbide Corporation) can be reacted readily with diisocyanates (toluene diisocyanate or similar diisocyanates). Normally 2 moles of diisocyanate are added per mole of polyethylene glycol so that the resulting product is an isocyanate capped intermediate. This material is then reacted in approximately equimolar quantities with a polystyrene glycol of suitable molecular weight under suitable conditions. The resulting high molecular weight block copolymers comprising segments of polyethylene oxide and polystyrene are polyurethanes of a special type. Such materials are not normally contaminated by any substantial amounts of homopolymer segments, and are extremely useful for the water retaining applications discussed in this invention.

However, the urethane linkages contained in these block copolymers can discolor during fabrication or during exposure to light. While this discoloration is not accompanied by substantial deterioration of physical properties, there are some applications where it is desired that the products of this invention do not contain urethane linkages. To circumvent the use of urethane linkages, the polymers can be prepared by a two-stage process. Consider the preparation again of a polystyrene-polyethylene oxide product. The BAB segment is first formed by well-known anionic techniques with B blocks [poly(ethylene oxide)] being one-half the desired final block length. This BAB segment may either be terminated by hydroxy groups or metal alkoxides at both ends. Once the BAB prepolymer described above is formed it can be reacted with diacid chlorides such as phosgene, adipoyl chloride and sebacoyl chloride to give alternating block copolymers. These reactions are summarized by the following equations:

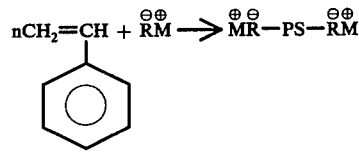

where $R^{\ominus}M^{\oplus}$ is a suitable organometallic initiator, PS is a polystyrene block of suitable molecular weight determined by the ratio of styrene monomer to organometallic initiator.

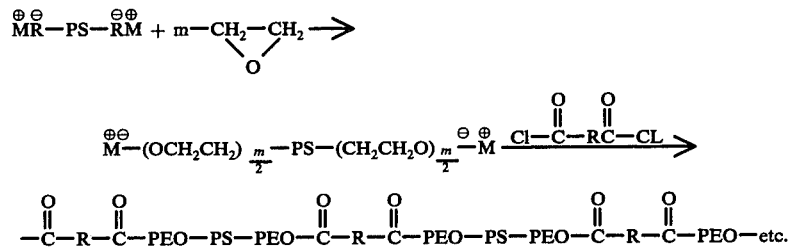

The PEO(polyethylene oxide) units are combined with other PEO units to create a segment which is substantially a total PEO block except for a small amount of coupling agent. This means that the molecular weight of the PEO block before coupling would be effectively doubled after coupling. The coupling agent represents such a small component of the total PEO block that the combined block operates as a single crystallized unit. A by-product metal chloride salt is removed from the polymer by extraction or can be left in. These polymers do not readily discolor and possess desirable properties even at relatively low molecular weights of 20,000 to 30,000. However, the requirements for the total PEO block length described above must still be met in order to achieve a rigid multiphase plastic.

The two processes described above are suitable for making multiphase plastics combining hydroxyl terminated hydrophilic blocks with those hydrophobic blocks, preferably those obtained by vinyl polymerization, such as polyethylene oxide and polystyrene, respectively. A third process can be considered as desirable for combining hydrophilic polymer blocks with hydrophobic polymer blocks, especially those obtained by condensation polymer techniques. This latter process is especially desired for it permits use of polyamide blocks terminated by amines, which are readily available.

First, the hydrophilic polymer block is reacted with diisocyanates as described above. Diisocyanates suitable for this reaction are those widely used in polyurethane technology. The capped poly(ethylene oxide) is then reacted with polyamides, terminated at both ends with amine functionality, to give block polymers consisting of hydrophilic and hydrophobic segments joined by urea linkages. The following equations describe this chemistry in general terms:

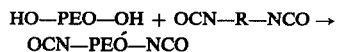

where PEO represents polyethylene oxide and PEÓ represents polyethylene oxide segments of higher molecular weight due to some condensation through urethane linkages

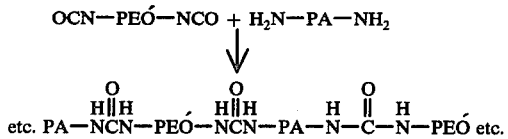

where PA represents polyamide segments.

The products of this invention are thermoplastic meaning that they can be fabricated into complex shapes utilizing conventional plastic-forming equipment. Because these products are not chemically crosslinked, the formed products can be reshaped, i.e., scrap can be reused. Alternatively if the need for a particular complex shape from these products no longer exists, the material can be recycled and used again.

Similarly, the water solvated gels described in this invention are capable of being recycled back to the unsolvated product repeatedly without loss of their water retaining capability.

One application of particular interest and well suited to the multiphase plastics of this invention is that of water sensitive foams. Using appropriate foaming agents such as difluoro dichloromethane, carbon dioxide, butane, pentane, etc., the multiphase plastics can be impregnated with small amounts of such systems. Then by merely exposing the impregnated shaped object to temperatures of above 50° C and below 250° C, a cellular product of excellent cell structure can be achieved. For example, a molded multiphase plastic impregnated with 1 to 20 weight percent foaming agent can merely be plunged into hot or boiling water. Almost immediately (5 secs to 2 minutes) a foamed product is achieved which is extremely flexible, strong and elastomeric. The flexibility under these conditions is, of course, achieved by the water solvation of the hydrophilic phase. If this same product is then permitted to dry, it retains its foamed shape but becomes rigid after the water has evaporated. This product can be recycled to recreate the flexible foam properties by exposing again to moisture. These flexible foam systems have excellent potential as humidifier pads, water retention aids, general purpose sponges and numerous other applications. Similarly, the dry rigid foams have many applications such as dehumidifying pads and mats, water detecting aids, etc.

Other applications which can be considered for these water sensitive multiphase thermoplastics, either in the dry state or in the water solvated state include soft contact lenses, medical uses such as implantations, denture linings, coatings for glass surfaces to make them fogproof, varnishes and lacquers and related coatings, coatings for boat bottoms, coatings for masonry surfaces, binding agents for cosmetics, hair spray and hair setting applications, dressings for burns and wounds, and similar type applications.

Other uses for these hydrophilic block copolymers of the present invention include the encapsulation of vitamins, drugs, antibiotics, and other medical aids so that these agents can be released at a controlled rate when contacted with water or aqueous solutions. Similarly, other materials may be encapsulated within the polymers of this invention such as pesticides, herbicides, insecticides, and applied to suitable substrates in order that these active agents be released when contacted with moisture.

A further use of these block copolymers is as coatings for the interior of pipes, tubes and other hollow containers used to transport liquids. Pipes coated with these polymers, when contacted with water or aqueous solutions, may exhibit incresed flow due to a lowered viscosity in the vicinity of the coating. In addition, articles, such as diapers, with improved absorbency of aqueous body fluids may be prepared from the polymers of this invention. Such articles can consist of these block copolymers contained between layers of other materials such as paper, textiles and the like.

The compositions of the instant invention are especially useful for preparing novel water containing gels. Said novel gels are characterized as the compositions, as previously described, in their water-swollen state. As such, they may contain from 30 to 98 weight percent water, preferably from 40 to 95 weight percent. The preferred styrene-ethylene oxide species of the instant invention may contain from 30 to 98 weight percent, preferably from 40 to 95 weight percent, water in its swollen state. These compositions may be utilized in all of the areas where the prior art crosslinked ethylene oxide polymers are used. Furthermore, other hydrophilic polymers, such as polyhydroxyethyl methacrylate which is used in selected applications such as the soft contact lens, may be conveniently replaced by the compositions of the instant invention. The most preferred use for the compositions of the instant invention, however, is in the agricultural area. Tapes formulated from the polymers of the instant invention, especially the styrene-ethylene oxide polymer, may be implanted with seeds and placed in the ground. The tape, because of its water sensitive nature, will hold water very tightly and thus it is extremely useful for planting in areas where water, i.e. rainfall, is scarce. The existence of domains, as described previously, gives other valuable properties to these water swollen compositions. That is, these systems do not dissolve, i.e. are not leeched out by the water, and thus are permanent. This characteristic is especially useful when these compositions are used for planting seeds.

The following are specific embodiments of the instant invention:

Polystyrene glycols were prepared (1) by a modification of the method of Merrill (J. Polymer Science 55, 343 (1961)) or by well-known anionic techniques. Hydroxyl terminated poly(ethylene oxides) or polyethyleneglycols of various molecular weights are commercially available from Union Carbide under the trade name Carbowax.

EXAMPLE 1

Synthesis of Polystyrene-Poly(ethylene oxide) Block Copolymer — 33 Weight Percent Poly(Ethylene Oxide)

To a dried flask equipped with stirrer and dropping funnel and containing 0.25 g toluene diisocyanate and 0.10 g triethylene diamine were slowly added 4.2 g (0.0007 mole) poly(ethylene oxide). The slow addition of the toluene diisocyanate permitted some condensation of the polyethylene oxide by reaction with the hydroxyl groups to create a polymer with an estimated molecular weight between 8,000 and 10,000. The reaction of the poly(ethylene oxide) and the toluene diisocyanate was carried out for approximately 17 hours at 40° C. At the end of this time 8.33 g of polystyrene glycol ($M_n$ 11900) dissolved in 75 ml Na-dried toluene were slowly added, and this stage of the reaction was carried on for 48 hours at ambient temperature. The product was precipitated in n-heptane and dried in a vacuum oven overnight. The sample was molded at 350° F for 2 minutes to give tough transparent film. After several weeks of exposure at ambient temperatures, it as observed that some yellowing of the film had occurred without a substantial loss of product properties.

EXAMPLE 2

Synthesis of Polystyrene-Poly(Ethylene Oxide) Block Copolymer — 57 Weight Percent Poly(Ethylene Oxide)

The procedure employed was nearly identical with Example 1 except 31.187 g of a polystyrene glycol ($M_n$ 4550) are used. Tough transparent films were obtained when compression molded under the conditions described in Example 1. The resulting products were somewhat clear immediately after molding, but in a short time the products were rigid, translucent plastics.

EXAMPLE 3

Synthesis of Polystyrene-Poly(Ethylene Oxide) Block Copolymer — 75 Weight Percent Poly(Ethylene Oxide)

To a dried flask equipped with stirrer and dropping funnel and containing 0.2112 g toluene diisocyanate and 0.0496 g triethylene diamine in 5 ml of Na-dried toluene was added slowly 3.187 g polystyrene glycol ($M_n$ 4550) dissolved in 20 ml Na-dried toluene. The reaction between the polystyrene glycol and the toluene diisocyanate was carried out at 40° C for approximately 17 hours. At the end of this time 14.00 g dihydroxy poly(ethylene oxide) of approximately 20,000 number average molecular weight (Carbowax 20M) in 35 ml Na-dried toluene was slowly added to the reaction flask. The reaction was carried out for at least 24 hours at 40° C. The block polymer was then precipitated in n-heptane and dried in a vacuum oven for 6 hours. Essentially quantitative yields were obtained. The films obtained when compression molded as described above were transparent, rigid and moderately tough. Hardness values on this product were obtained. On a Shore A scale the materials were too hard to obtain reliable values. Shore C provided hardness values of 78—equivalent to a moderately hard plastic.

EXAMPLE 4

Synthesis of Poly(Piperazine-Sebacamide)-Poly(Ethylene Oxide) Block Copolymer

The reaction of 0.263 g toluene diisocyanate with 4.417 g poly(ethylene oxide) ($M_n$ 6000) in the presence of 0.0496 g triethylene diamine was nearly identical with the description of Example 1. After this capping reaction was complete, 5.00 g poly(piperazine-sebacamide) dissolved in 60 ml methylene chloride was rapidly added, and the reaction continued for 80 minutes. The viscous cement was then precipitated in n-heptane and dried in a vacuum oven overnight. The polymer was completely soluble in methylene chloride and tough, rigid films were formed by compression molding at 400° F. for 3 minutes.

EXAMPLE 5

Efficacy of Polystyrene-Poly(Ethylene Oxide) Block Copolymer in Absorbing Water

Block copolymers of polystyrene and poly(ethylene oxide) were tested for their efficacy in absorbing water. Compression molded strips of polystyrene-poly(ethylene oxide) block copolymers containing (a) 33 weight percent, (b) 57 weight percent, and (c) 75 weight percent poly(ethylene oxide) were used. The testing consisted of immersing a known weight of the polymer into 20 ml of distilled water for 24 hours. The test specimen was then weighed after the elapsed time, and percent water absorption calculated. In all cases the materials achieved their water solvated form relatively quickly (1 hour or so) and while they increased substantially in volume, their general configurations were retained. Good dimensional stability was observed in all cases with the block copolymers. The results of this test are given in Table I.

TABLE I
Effect of Poly(Ethylene Oxide) Content on Water Absorption by Poly(Ethylene Oxide)-Polystyrene Block Copolymers

| Wt % Poly(ethylene) oxide | Weight of Original Sample | Weight of Sample After $H_2O$ Absorption | % Change |
|---|---|---|---|
| 100 | 0.100 g | Completely soluble | — |
| 33 | 0.0693 g | 0.1043 | 50.5 |
| 57 | 0.0754 g | 0.3000 | 390.0 |
| 75 | 0.0529 g | 0.5947 | 1024.0 |

EXAMPLE 6

Efficacy of Poly(Ethylene Oxide)-Poly(Piperazine Sebacamide) Block Copolymer in Absorbing Water The procedure described in Example 5 was repeated using a molded strip of poly(ethylene oxide)-poly(piperazine sebacamide). The results are given in Table II.

TABLE II
Effect of Poly(Ethylene Oxide) Content on Water Absorption By Poly(Ethylene Oxide)-Poly(Piperazine-Sebacamide) Block Copolymer

| Wt % Poly(ethylene oxide) | Weight of Original Sample | Weight of Sample After $H_2O$ Absorption | % Change |
|---|---|---|---|
| 100 | 0.0829 g | Completely soluble | — |
| 47 | 0.0827 g | 0.1875 g | 226 |

EXAMPLE 7

This example demonstrates the preparation of a block copolymer of an $xB$—$[AB]_n$—$yA$ type wherein $n > 1$ and $x$ and $y$ may be 0 or 1, containing about 70 weight percent polyethylene oxide, but containing no urethane linkages. To an evacuated one-liter flask equipped with suitable stirring, condensers, and a nitrogen atmosphere, was added 500 ml freshly distilled tetrahydrofuran and 0.01407 moles of a potassium dianion of α-methyl styrene tetramer. The contents were cooled to −20° C and 45 g pure styrene monomer was added. The styrene immediately began to polymerize and the reaction was conducted for 3½ hours. Then, 105 g of ethylene oxide was added. The polymerization of ethylene oxide was conducted for 24 hours. (The molecular weights of the polystyrene blocks and the polyethylene oxide blocks were not known exactly in this case because that is dependent on the efficacy of the initiator with each species. It is believed that the polystyrene block was about 5,000 and the PEO blocks on each end were estimated to be about 5,500 each.) Of course, after the coupling reaction, the PEO block effectively is doubled, that is the molecular weight of the PEO block is about 11,000. At the end of 24 hours, 3.36 g of sebacoyl chloride was added dropwise as a coupling agent over a 5-hour period. The viscosity of the solution appeared to increase. The entire solution was precipitated in a severalfold excess of n-heptane, and the powder dried overnight in a vacuum oven (30°–40° C). The yield was 138 g of block copolymer, with a number average molecular weight of 33,000 as established by gel permeation chromatography.

EXAMPLE 8

The block polymer obtained in Example 7 was compression molded in a standard laboratory press at 135° C and 10,000 psi pressure. The resulting thin plaques (0.021 inches thick) were rigid, translucent, homogeneous, and cracked when bent double quickly and therefore were somewhat brittle. Stress-strain measurements were obtained on a Instron testing machine. Tensile strength at break was 1,254 psi, elongation at break was 2.8%, and the stiffness modulus (as determined by the 1% secant modulus was 45,250 psi. This value is representative of a rigid plastic material.

EXAMPLE 9

This example describes the plasticization of a polystyrene-polyethylene oxide block copolymer with water. Films of the block copolymer described in Example 7 were obtained by compression molding, and immersed in water for 2, 5 and 10 minutes, and removed. The stress strain properties were then obtained as rapidly as possible. It was observed that even at very low times of water immersion the rigid plastic became flexible, tough, elastomeric, and nearly transparent. The physical properties of the films and amounts of water retained are shown below.

TABLE III

Effect of Water on Properties of (PS-PEO)$_n$ Block Polymer

| Sample | Initial Polymer Weight | Weight H$_2$O Absorbed | Tensile Strength, psi | % Elongation |
|---|---|---|---|---|
| Unplasticized | — | — | 1254 | 2.8 |
| Immersed H$_2$O, 2 min. | .1169 g | .088 | 540 | 1024 |
| Immersed H$_2$O 5 min. | .1158 g | .178 | 75 | 242 |
| Immersed H$_2$O 10 min. | .1123 g | .295 | 32 | 93 |

EXAMPLE 10

This example demonstrates the influence of homopolymer contamination on an xB—[AB]$_n$—yA type block copolymer of polystyrene and polyethylene oxide wherein $n > 1$ and $x$ and $y$ may be 0 or 1. A sample of the block copolymer described in Example 7 was blended in solution (chloroform) with 10, 25 and 50% of polystyrene homopolymer and polyethylene oxide homopolymer, respectively, and the solutions were then precipitated in heptane, filtered, and the products dried. The resulting blends were compression molded at 135° C or higher depending on the composition. A judgment of the appearance and the physical properties of these blends was made in comparison to the block copolymer, and is recorded in the table below. Samples of the blends were then placed in water and after 1 hour a judgment made of their appearance and physical properties as recorded below.

TABLE IV

Comparison of Homopolymer Blends With Block Copolymer (AB)$_n$(PS-PEO)$_n$ With 70% PEO

| Homopolymer Content | APPEARANCE | | | |
|---|---|---|---|---|
| | Dry | | Wet | |
| | Clarity | Strength | Clarity | Strength |
| 50% Polystyrene | Opaque | Very Brittle | Opaque, does not swell | No substantial strength |
| 25% Polystyrene | Opaque | Brittle | Opaque | Leathery |
| 10% Polystyrene | Slightly Opaque | Brittle | Opaque | Somewhat Elastic |
| 50% Polyethylene oxide | Opaque | Brittle | Opaque | Elastic, sticky |
| 25% Polyethylene oxide | Milky | Brittle | Opaque | Elastic |
| 10% Polyethylene Oxide | Slightly milky | Brittle | Almost clear | Elastic |
| (PS-PEO)$_n$ Block Polymer | Almost clear | Moderately Strong | Clear | Elastomeric, Strong |

These results show that as little as 10 weight percent hydrophobic block (polystyrene) has an adverse effect on the physical properties of both plasticized and unplasticized block polymer. Indeed, some of the blends in the table above, both with the hydrophilic and hydrophobic homopolymer contaminant, were so brittle, they could not be removed from the mold without breaking. In the case of the polyethylene oxide homopolymer blends, at a level of 10% there was not much difference in appearance from the blend, but it appeared that the homopolymer was being leached out when the sample was placed in water.

Based on these experiments, it is clear that contamination by homopolymer based on the hydrophobic phase is extremely undesirable at even very low levels (10%). In the case of contamination by homopolymer based on the hydrophilic phase, the adverse effects are less pronounced; however, it is desired that no more than 15% of this type contaminant be present.

EXAMPLE 11

This example demonstrates the use of a multiphase plastic based on hydrophilic and hydrophobic polymer blocks in agricultural applications. A small flower pot was filled with a mixture of sand and a water swollen (25 g polymer, 100 g water) block copolymer of Example 7, dispersed in finely divided form within the sand such that the water swollen polymer constituted about 25% by volume of the entire sand-polymer mixture. As a control, another flower pot was filled, with sand to which 100 ml of water was added. To each flower pot about 5 radish seeds (American Seed Co., Lancaster, Pa.) were placed about ¼ to ½ inch below the surface.

The pots were exposed to a southern exposure window light. No further amounts of water were added to either vessel. After 6 days the seeds in the vessel containing the block copolymer had germinated to yield about 5 small (¼ to ½ inch high) plants while in the control flower pot no germination had occurred. Quite clearly the block copolymer in a water swollen state had provided a proper balance of moisture to the seeds such that germination was expedited. It was observed in the course of this experiment that in the control vessel the sand had dried out after several days, while the vessel containing block copolymer was moist.

This experiment demonstrates that the novel copolymers of the instant invention can be utilized in the process disclosed in U.S. Pat. No. 3,336,129 herein incorporated by reference. However, as discussed above, the novel copolymers of the instant invention possess fabrication advantages over the crosslinked polymers disclosed in said patent and thus represent an improvement over the process disclosed therein.

EXAMPLE 12

This example illustrates the preparation of a foamed multiphase plastic consisting of hydrophobic and hydrophilic phases. The polystyrene-polyethylene oxide block copolymer of Example 7 was compression molded into thin plaques about 0.028 inches thick. These were subdivided further into pads about ¼ inch wide and ¼ to ½ inch long and placed into a glass pressure vessel which was then cooled to $-78°$ C to condense about 25 ml of dichlorodifluoromethane (Freon 12). This was capped and held for 3 days at room temperature in order that the small pads absorbed an equilibrium amount of Freon 12.

Following three days the Freon 12 was rapidly evaporated and the small pads removed. They appeared about the same as before exposure to the Freon. A rectangular pad of 0.052 g weight and with dimensions of 0.0285 × 0.272 × 0.474 inches was dropped into boiling water. Immediately a foam resulted and in 15 seconds the sample was removed, measured and weighed. The weight was 0.110 g and the dimensions were 0.039 × 0.438 × 0.625 inches. The product was opaque, strong, flexible and possessed excellent cell structure. Calculations reveal a foam density of this product to be approximately 35 to 40 lbs per cubic foot. When dried the resulting product was then a rigid foam, retaining the rectangular configuration. The dried foam could be swollen with water, and subsequently dried, with this cycle being reproduced numerous times.

What is claimed is:

1. A method of promoting the survival and growth of plants which comprises admixing with the plant growth medium in which said plants are grown from about 25 weight percent of a thermoplastic copolymer having an average molecular weight of at least 10,000, selected from the group consisting of copolymers represented by graph copolymers having the general formula

and block copolymers having the general formula $xB-[AB]_n-yA$ wherein $n$ is an integer $\geq 1$, $m$ is $> 1$, $x$ and $y$ are 0 or 1, and $y$ is 1 when $n$ is 1, A is a thermoplastic hydrophobic polymer block having a softening point of at least 35° C and a molecular weight of at least 2,000, and B is a thermoplastic hydrophilic polymer block having a softening point of at least about 35° C and a molecular weight of at least about 6,000 and which comprises from about 30–97 weight % of said copolymer.

2. The method of claim 1 wherein B is selected from the group consisting of poly(ethylene oxide, polyacrylamide, poly-α-hydroxyethylmethacrylate and copolymers thereof and comprises greater than 50% by weight of said composition, and A is selected from the group consisting of polystyrene, poly(t-butyl-styrene), polyvinyl, toluene, polymethylmethacrylate, polyacrylonitrile, polymethacrylonitrile, polylactones, polyamides and copolymers thereof.

3. The method of claim 2 wherein A is polystyrene.

4. The method of claim 1 wherein said thermoplastic copolymer is selected from the group consisting of block copolymers having the general formula $xB-[AB]_n-yA$ wherein $n$ is an integer $\geq 1$, $x$ and $y$ are 0 or 1, and $y$ is 1 when $n$ is 1, A is a thermoplastic hydrophobic polymer block having a softening point of at least 35° C and a molecular weight of at least 2,000, and B is a thermoplastic hydrophilic polymer block having a softening point of at least about 35° C and a molecular weight of at least about 6,000 and which comprises from about 30–97 weight % of said copolymer, said composition being further characterized as being substantially free from homopolymeric impurities.

5. The method of claim 4 wherein A is polystyrene and B is poly(ethylene oxide).

6. An improved method of planting agricultural seeds in a plant growth medium in which said seeds will germinate, said seeds being disposed within a polymeric tape, said tape being placed within said plant growth medium, wherein the improvement comprises forming said tape from a thermoplastic copolymer having an average molecular weight of at least 10,000, selected from the group consisting of copolymers represented by graph copolymers having the general formula

and block copolymers having the general formula $xB-[AB]_n-yA$ wherein $n$ is an integer $\geq 1$, $m$ is $> 1$, $x$ and $y$ are 0 or 1, and $y$ is 1 when $n$ is 1, A is a thermoplastic hydrophobic polymer block having a softening point of at least 35° C and a molecular weight of at least 2,000, and B is a thermoplastic hydrophilic polymer block having a softening point of at least about 35° C and a molecular weight of at least about 6,000 and which comprises from about 30–97 weight % of said copolymer, whereby said polymer absorbs and retains water thereby forming a water swollen tape disposed in said plant growth medium for improving said germination of said seeds.

7. The method of claim 6 wherein the water swollen composition comprises from about 30 to about 98 weight % water.

8. The method of claim 7 wherein said thermoplastic copolymer is selected from the group consisting of block copolymers having the general formula $xB-[AB]_n-yA$ wherein $n$ is an integer $\geq 1$, $x$ and $y$ are 0 or 1, and $y$ is 1 when $n$ is 1, A is a thermoplastic hydrophobic polymer block having a softening point of at least 35° C and a molecular weight of at least 2,000, and B is a thermoplastic hydrophilic polymer block having a softening point of at least about 35° C and a molecular weight of at least about 6,000 and which comprises from about 30–97 weight % of said copolymer, said composition being further characterized as being substantially free from homopolymeric impurities.

9. The method of claim 8 wherein A is polystyrene and B is poly(ethylene oxide).